(12) United States Patent
Oh et al.

(10) Patent No.: US 11,264,146 B2
(45) Date of Patent: Mar. 1, 2022

(54) FLAT CABLE WITH IMPROVED SHORT-CIRCUIT PREVENTION FUNCTION

(71) Applicant: LG Chem, Ltd., Seoul (KR)

(72) Inventors: Kyu-Hwan Oh, Daejeon (KR); Bo-Sung Kim, Daejeon (KR); Chang-Bok Lee, Daejeon (KR); Yang-Lim Choi, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 16/615,240

(22) PCT Filed: Jan. 25, 2019

(86) PCT No.: PCT/KR2019/001123
§ 371 (c)(1),
(2) Date: Nov. 20, 2019

(87) PCT Pub. No.: WO2019/147081
PCT Pub. Date: Aug. 1, 2019

(65) Prior Publication Data
US 2020/0203038 A1    Jun. 25, 2020

(30) Foreign Application Priority Data

Jan. 25, 2018  (KR) .................. 10-2018-0009494

(51) Int. Cl.
*H01B 7/08* (2006.01)
*H01B 7/02* (2006.01)
(Continued)

(52) U.S. Cl.
CPC ............ *H01B 7/0823* (2013.01); *H01B 7/02* (2013.01); *H01B 7/10* (2013.01); *H01M 50/502* (2021.01); *H01R 12/771* (2013.01); *H01R 12/79* (2013.01)

(58) Field of Classification Search
CPC .................................. H01B 7/08; H01R 12/77
See application file for complete search history.

(56) References Cited

U.S. PATENT DOCUMENTS 6,452,754 B1 * 9/2002 Mizuta ................... G11B 5/486
174/117 FF
7,301,104 B2 * 11/2007 Miura ..................... H05K 1/118
174/117 F
(Continued)

FOREIGN PATENT DOCUMENTS

CN      101304133 A     11/2008
CN      101533971 A     9/2009
(Continued)

OTHER PUBLICATIONS

International Search Report from Application No. PCT/KR2019/001123 dated May 10, 2019, 2 pages.
(Continued)

*Primary Examiner* — Chau N Nguyen
(74) *Attorney, Agent, or Firm* — Lerner, David, Littenberg, Krumholz & Mentlik, LLP

(57) ABSTRACT

Disclosed is a flat cable with an improved function of preventing a short phenomenon that may occur when the flat cable is incorrectly inserted into a connector. The flat cable according to an embodiment of the present disclosure is a flat cable extending straight in a direction and having a front end that is inserted and connected to an external connector, and includes a plurality of conductors extending straight along a lengthwise direction of the flat cable, spaced apart a predetermined distance in a widthwise direction of the flat cable, and a cable body made of an insulating material, and extending straight along the lengthwise direction of the flat cable, wherein the conductors are mounted on at least one surface.

10 Claims, 11 Drawing Sheets

(51) Int. Cl.
  *H01B 7/10* (2006.01)
  *H01R 12/77* (2011.01)
  *H01R 12/79* (2011.01)
  *H01M 50/502* (2021.01)

(56) References Cited

U.S. PATENT DOCUMENTS

| | | | |
|---|---|---|---|
| 7,745,729 B2* | 6/2010 | Hu | G02F 1/13452 |
| | | | 174/117 F |
| 2008/0084530 A1* | 4/2008 | Hirabayashi | H05K 1/118 |
| | | | 349/150 |
| 2009/0233462 A1 | 9/2009 | Cheng | |
| 2017/0194076 A1* | 7/2017 | Yosui | H05K 1/0219 |

FOREIGN PATENT DOCUMENTS

| | | |
|---|---|---|
| CN | 201946777 U | 8/2011 |
| CN | 206332208 U | 7/2017 |
| EP | 0581180 A2 | 2/1994 |
| EP | 0954065 A2 | 11/1999 |
| JP | S62217581 A | 9/1987 |
| JP | 2000021513 A | 1/2000 |
| JP | 2004192913 A | 7/2004 |
| JP | 2011034957 A | 2/2011 |
| JP | 2011198687 A | 10/2011 |
| JP | 2012099235 A | 5/2012 |
| JP | 2014017361 A | 1/2014 |
| JP | 2014032907 A | 2/2014 |
| JP | 2017204380 A | 11/2017 |
| KR | 20080018721 A | 2/2008 |
| KR | 101133954 B1 | 4/2012 |
| KR | 101496719 B | 2/2015 |

OTHER PUBLICATIONS

Search Report from First Chinese Office Action for Application No. 2019800029871 dated Sep. 3, 2020; 3 pages.

* cited by examiner

FLAT CABLE WITH IMPROVED SHORT-CIRCUIT PREVENTION FUNCTION

CROSS-REFERENCE TO RELATED APPLICATION

The present application is a national phase entry under 35 U.S.C. § 371 of International Application No. PCT/KR2019/001123 filed Jan. 25, 2019, published in Korean, which claims priority from Korean Patent Application 10-2018-0009494 filed Jan. 25, 2018, all of which are incorporated herein by reference.

TECHNICAL FIELD

The present disclosure relates to a flat cable with improved short-circuit prevention function, and more particularly, to a flat cable with an improved function of preventing a short phenomenon that may occur when the flat cable is incorrectly inserted into a connector.

BACKGROUND ART

Recently, there is dramatically growing demand for portable electronic products such as laptop computers, video cameras and mobile phones, and with the extensive development of electric vehicles, accumulators for energy storage, robots and satellites, many studies are being made on high performance secondary batteries that can be recharged repeatedly.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages of free charging and discharging, a very low self-discharge rate and high energy density.

Batteries are used in various fields, and more recently, in many cases, they are used in applications requiring large capacity such as electricity powered vehicles or smart grid systems. To increase the capacity of battery packs, an attempt may be made to increase the capacity of secondary batteries or battery cells themselves, but in this case, the capacity increase effect is not so large, and there is a physical limitation on the size expansion of the secondary batteries and another drawback is inconvenient management. Accordingly, generally, a battery pack including a plurality of battery modules connected in series and in parallel is widely used.

In many cases, the battery pack uses a flat cable as a relay cable for different internal components of the battery pack. For example, the flat cable may be used as a relay cable between different internal components of a Battery Management System (BMS).

Alternatively, the flat cable may be used as a relay cable between a BMS and a cell assembly. In this case, the flat cable may transmit a voltage value, a current value or a temperature value of each secondary battery included in the cell assembly from the cell assembly to the BMS. For the flat cable, a Flexible Flat Cable manufactured using the laminate technique, for example, may be provided in the battery pack.

FIG. 1 is a schematic perspective view showing the configuration of the conventional flat cable.

Referring to FIG. 1, in general, the conventional flat cable may extend straight in a direction. For example, on the basis of FIG. 1, the flat cable may extend straight in y-axis direction.

The flat cable may include a cable body 20 formed by arranging a plurality of conductors 10 in parallel at a predetermined interval and performing laminate processing of the plurality of conductors 10 on one or two sides by an insulating element having a predetermined adhesive layer.

Additionally, the flat cable may include the plurality of conductors 10 on at least one surface of the cable body 20 made of an insulating material. For example, as shown in the configuration of FIG. 1, the flat cable may include the plurality of conductors 10 on the upper surface of the cable body 20 in z-axis direction. Here, the flat cable may be made of a flexible material. For example, the flat cable may be a Flexible Flat Cable (FFC).

The flat cable may include a shield 30 that is made of an insulating material, and covers the surface of each of the plurality of conductors 10 and the cable body 20. Here, when the flat cable includes the shield 30, the shield 30 may not be provided on part of the front side surface of the flat cable. That is, the plurality of conductors 10 and the cable body 20 may be exposed through part of the surface in the forward direction of the flat cable. For example, on the basis of FIG. 1, part of the flat cable where the conductor is exposed in z-axis direction at the front side end, i.e., the end of y-axis direction of the flat cable may be referred to as a cable insert part 21. Additionally, part where the shield 30 is provided so that the conductor is not exposed in z-axis direction may be referred to as a cable shield part 22. The cable shield part 22 occupies most of the entire flat cable except the lengthwise direction end.

Generally, the front end of the flat cable, i.e., the cable insert part 21 may be inserted and connected to the front end of a connector of a circuit board. However, when the cable insert part 21 is improperly and incorrectly inserted into the connector, a problem may occur. It will be described in more detail with reference to FIGS. 2 and 3.

FIG. 2 is a diagram showing an example in which the conventional flat cable is incorrectly inserted into the connector, and FIG. 3 is a diagram showing a short circuit between the conventional flat cable and the connector lead connected to the circuit board when the flat cable is incorrectly inserted into the connector.

In more detail, the flat cable may be provided such that the front end of the flat cable is inserted into the connector 51 provided in the circuit board 50. For example, on the basis of FIG. 2, the cable insert part 21 of the flat cable should be normally inserted into the connector 51 in the direction of the arrow C1 shown in FIG. 2.

However, as shown in FIG. 2, when the flat cable is incorrectly inserted into the connector 51, the front end of the conductor 10 provided in the flat cable may contact the lead 52 of the connector 51. Here, the lead 52 may be made of an electrical conductive material to allow the current to flow.

Here, referring to FIG. 3 together, when the flat cable is abnormally and incorrectly inserted into the connector 51, a short phenomenon may occur, causing the formation of an abnormal electrical passage. That is, when the lead 52 of an electrical conductive material directly comes into electrical contact with the conductor 10, a short phenomenon may occur. Additionally, in some cases, the internal component of the battery pack may be damaged due to the overcurrent. For example, on the basis of FIG. 3, when the flat cable is incorrectly inserted, the lead 52 and the conductor 10 may be directly brought into electrical contact at an area indicated by the arrow C2.

DISCLOSURE

Technical Problem

The present disclosure is designed to solve the above-described problem, and therefore the present disclosure is directed to providing an improved flat cable for enhancing the safety of the flat cable by preventing a short phenomenon that may occur when the flat cable is incorrectly inserted into a connector.

These and other objects and advantages of the present disclosure can be understood by the following description and will be apparent from the embodiments of the present disclosure. Further, it will be readily understood that the objects and advantages of the present disclosure can be realized by the means set forth in the appended claims and combinations thereof.

Technical Solution

A flat cable according to an aspect of the present disclosure is a flat cable extending straight in a direction and having a front end that is configured to be inserted and connected to an external connector, and includes a plurality of conductors made of an electrical conductive material, and extending straight along a lengthwise direction of the flat cable, spaced apart a predetermined distance in a widthwise direction of the flat cable, and a cable body made of an insulating material, and extending straight along the lengthwise direction of the flat cable, wherein the conductors are mounted on at least one surface, the cable body includes a cable insert part at the front end of the flat cable, and the cable insert part includes a protruding portion protruding out in the lengthwise direction of the flat cable beyond the plurality of conductors.

The protruding portion may be configured to protrude out a predetermined distance in the lengthwise direction beyond the plurality of conductors such that a gap is formed between an extension line defined by an end of the plurality of conductors and an extension line defined by an end of the protruding portion.

The cable insert part may include a plurality of protruding portions.

The protruding portions may be disposed at two ends in a widthwise direction of the cable insert part.

The protruding portion may be configured to have a cuboid shape.

The cable insert part may further include at least one fixing portion formed concavely inward from two sides of the cable insert part and configured to stably fix the cable insert part to the external connector when the cable insert part is inserted into the external connector.

The cable insert part may further include a reinforcing portion provided on at least part of a surface of the protruding portion and configured to reinforce stiffness of the protruding portion.

The protruding portion may be formed with a protrusion height that is higher than a height of a lead connected to the circuit board.

A battery pack according to another aspect of the present disclosure includes the flat cable according to any of the embodiments of the present disclosure described herein.

Advantageous Effects

According to an embodiment of the present disclosure, it is possible to prevent a lead of a connector of a circuit board and a conductor provided in a flat cable from being directly brought into contact even though the end of the flat cable is incorrectly inserted in the process of inserting the flat cable into the connector.

In addition, according to an embodiment of the present disclosure, even though the flat cable is incorrectly inserted into the connector, a predetermined gap may be formed between the lead of the connector and the conductor provided in the flat cable. Accordingly, it is possible to prevent a short phenomenon that may occur when the flat cable is incorrectly inserted into the connector, and improve safety of the flat cable.

The present disclosure may have a variety of other effects, and these and other effects of the present disclosure can be understood by the following description and will be apparent from the embodiments of the present disclosure.

BRIEF DESCRIPTION OF DRAWINGS

The accompanying drawings illustrate a preferred embodiment of the present disclosure, and together with the following detailed description of the present disclosure, serve to provide a further understanding of the technical aspects of the present disclosure, and thus the present disclosure should not be construed as limited to the drawings.

DETAILED DESCRIPTION

Figure 1:
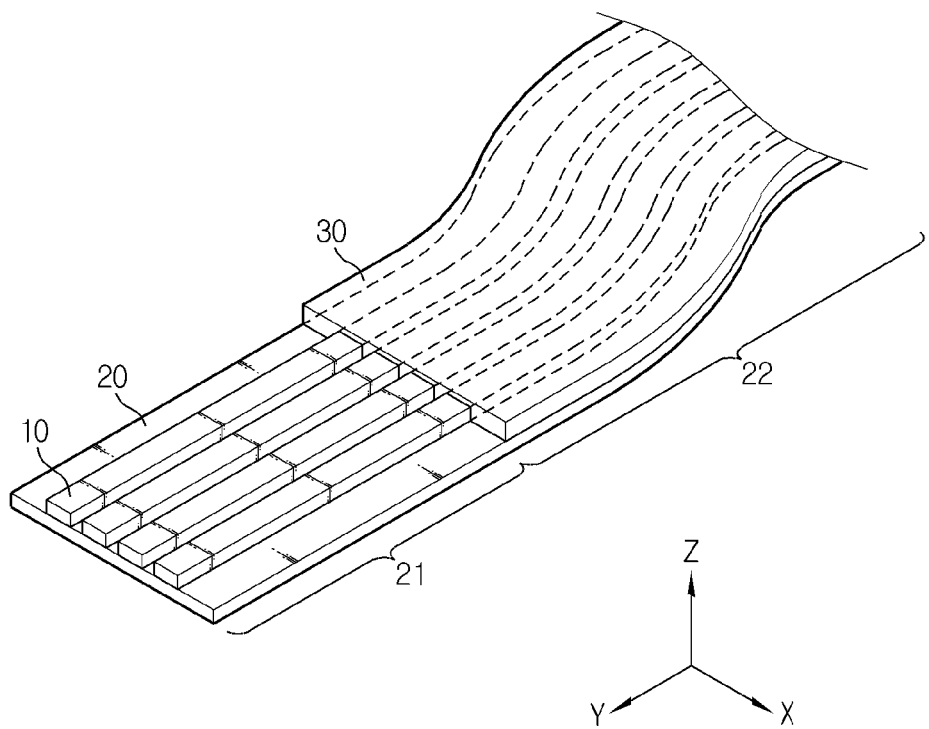
FIG. 1 is a schematic perspective view showing the configuration of a conventional flat cable.

Hereinafter, the preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments described herein and illustrations shown in the drawings are just a most preferred embodiment of the present disclosure, but not intended to fully describe the technical aspects of the present disclosure, so it should be understood that other equivalents and modifications could be made thereto at the time of filing the application.

Additionally, in describing the present disclosure, when it is deemed that a certain detailed description of relevant known elements or functions renders the key subject matter of the present disclosure ambiguous, the detailed description is omitted herein.

Unless the context clearly indicates otherwise, it will be understood that the term "comprises" or "includes" when used in this specification, specifies the presence of stated elements, but does not preclude the presence or addition of one or more other elements.

Figure 4:
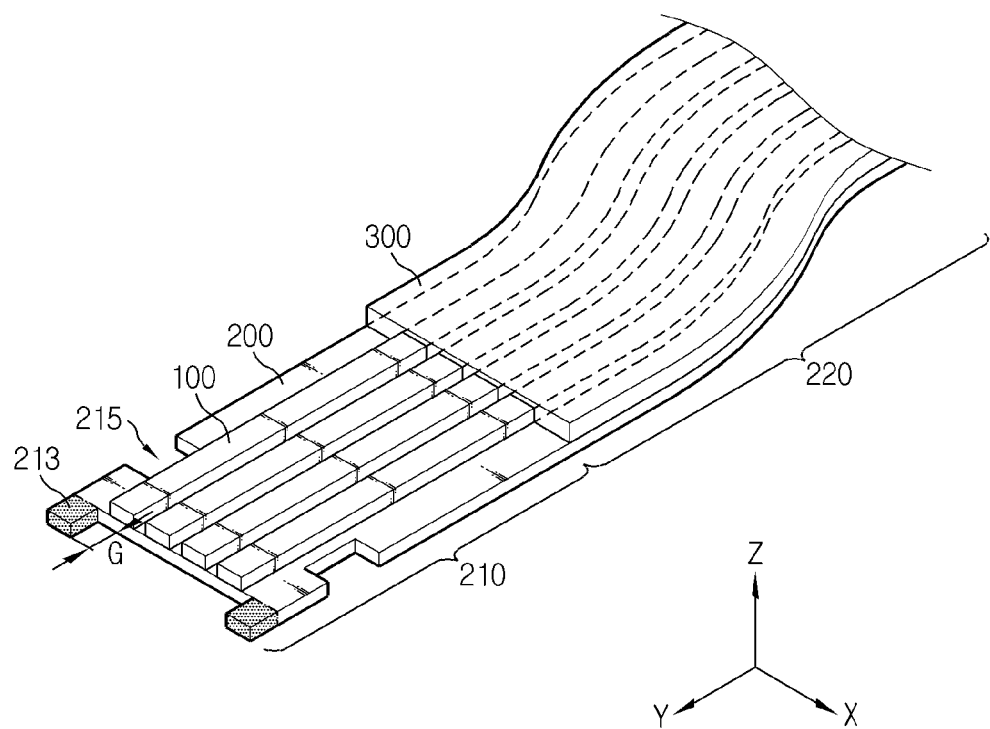
FIG. 4 is a schematic perspective view showing a configuration of a flat cable according to an embodiment of the present disclosure.

FIG. 4 is a schematic perspective view showing the configuration of a flat cable according to an embodiment of the present disclosure.

Referring to FIG. 4, the flat cable according to the present disclosure may include a conductor 100 and a cable body 200.

Here, the flat cable may extend straight in a direction. For example, on the basis of FIG. 4, the flat cable may extend straight in the lengthwise direction (+y-axis direction).

Figure 2:
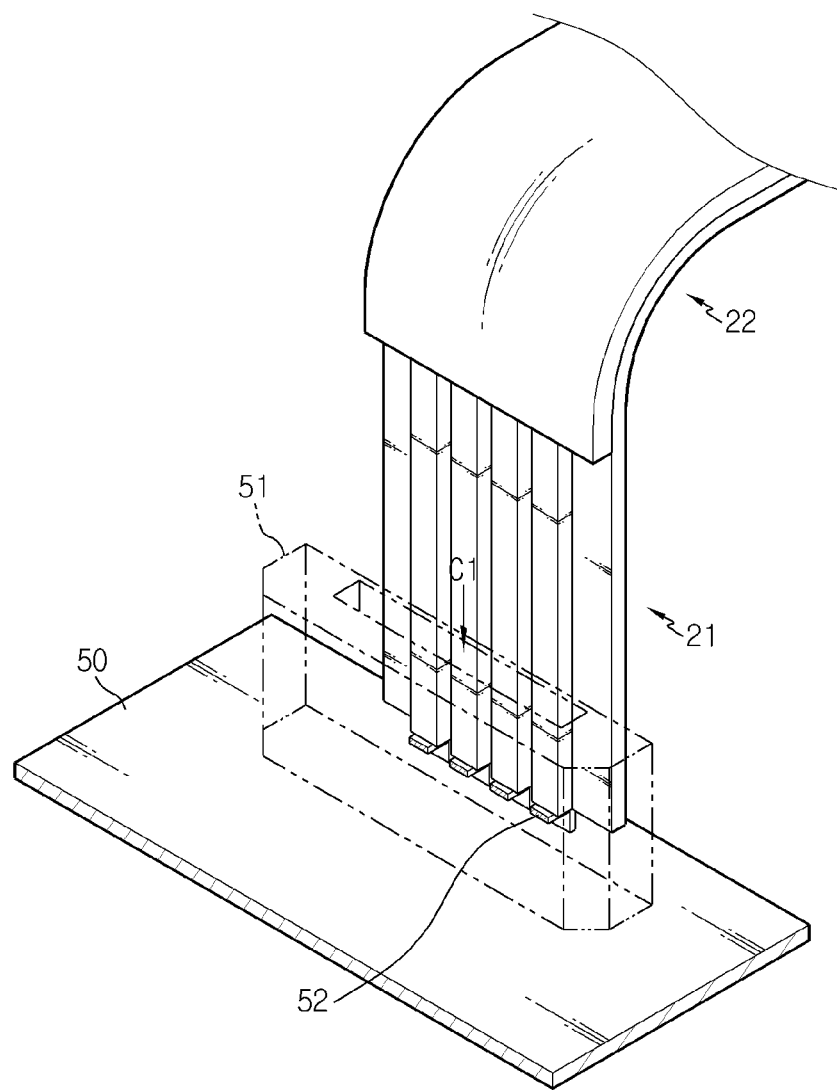
FIG. 2 is a diagram showing an example in which a conventional flat cable is incorrectly inserted into a connector.
Figure 3:
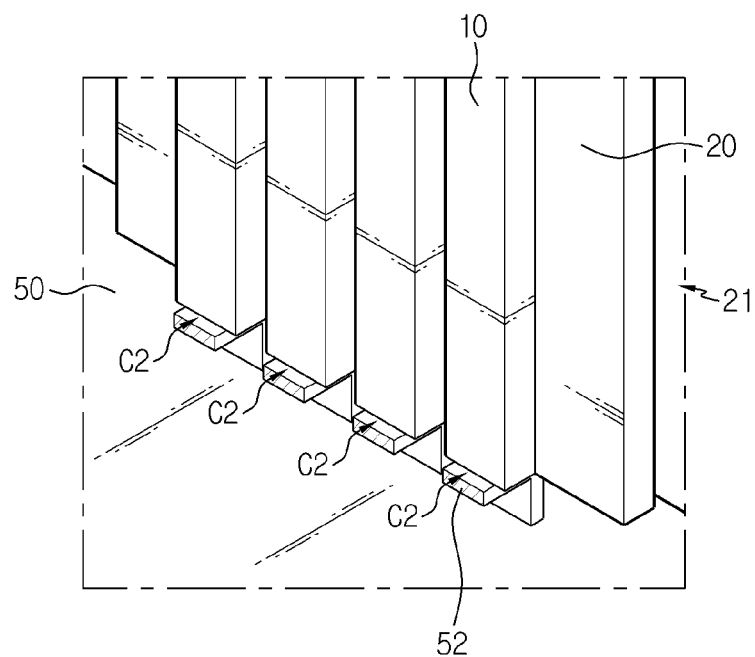
FIG. 3 is a diagram showing a short circuit between a conventional flat cable and a connector lead connected to a circuit board when the flat cable is incorrectly inserted into a connector.

Additionally, the front end of the flat cable may be inserted and connected to an external connector. In more detail, the front side end (the end of +y-axis direction in FIG. 4) of the flat cable may be inserted and connected to a connector provided in a circuit board. Here, the circuit board has a connector as shown in FIG. 2, and the connector and the circuit board may be electrically connected through a lead. For example, the flat cable according to the present disclosure may be implemented as a Flexible Flat Cable (FFC).

The conductor 100 may be made of an electrical conductive material. The conductor 100 may be made of a conductive metal, for example, gold, silver, copper, lead or aluminum.

Additionally, the conductor 100 may extend straight along the lengthwise direction of the flat cable as shown in the configuration of FIG. 4. Here, the lengthwise direction refers to a direction (+y-axis direction in FIG. 4) in which the flat cable is inserted into the connector.

Additionally, a plurality of conductors 100 may be arranged in the widthwise direction of the flat cable, spaced apart a predetermined distance. Here, the widthwise direction may refer to a direction (x-axis direction in FIG. 4) perpendicular to the lengthwise direction. Here, the plurality of conductors 100 may be arranged in parallel at a predetermined interval.

The cable body 200 may be made of an electrical insulating material. For example, the cable body 200 may be made of polymer such as polypropylene (PP), polyethylene (PE) or polyvinyl chloride (PVC).

Additionally, the cable body 200 may extend straight along the lengthwise direction (y-axis direction in FIG. 4). Particularly, the cable body 200 may extend straight from one end of the flat cable to the other end.

Additionally, the conductor 100 may be mounted on at least one surface of the cable body 200. For example, the conductor 100 may be mounted on the upper surface of the cable body 200 as shown in FIG. 4. Alternatively, although not shown in the drawings, the conductor 100 may be mounted on two surfaces of the cable body 200.

The cable body 200 may be formed by arranging the plurality of conductors 100 in parallel at a predetermined interval and performing laminate processing of the plurality of conductors 100 on one or two sides by an insulating element having a predetermined adhesive layer. For example, the insulating element may have a predetermined insulating adhesive layer. Here, the insulating adhesive layer may be provided on the upper surface of the insulating element. Additionally, the insulating adhesive layer may be an adhesive layer using epoxy resin, acrylic resin, melamine resin, polyamide resin or polyimide resin as a binder resin. However, the present disclosure is not limited thereto. That is, in addition to the laminate processing, the plurality of conductors 100 may be provided in the cable body 200 through a variety of other processing techniques.

Additionally, the flat cable according to the present disclosure may further include a shield 300. The shield 300 may be made of an insulating material, and cover the surface of each of the plurality of conductors 100 and the cable body 200. Here, when the flat cable includes the shield 300, the shield 300 may not be provided on part of the front side surface of the flat cable. That is, the plurality of conductors 100 and the cable body 200 may be exposed through part of the surface in the forward direction (+y-axis direction in FIG. 4) of the flat cable.

Here, on the basis of FIG. 4, part of the flat cable where the conductor 100 is exposed in +z-axis direction at the front side end (the end of +y-axis direction) of the flat cable may be referred to as a cable insert part 210. Additionally, part where the shield 300 is provided so that the conductor 100 is not exposed in +z-axis direction may be referred to as a cable shield part 220. The cable shield part 220 occupies most of the entire flat cable except the lengthwise direction end. Accordingly, the cable body 200 of the flat cable according to the present disclosure includes the cable insert part 210 and the cable shield part 220.

The cable insert part 210 may be made of an insulating material, and the conductor 100 may be provided on at least one surface. Further, the cable insert part 210 does not have the shield 300, so at least part of the conductor 100 may be exposed to the outside. For example, as shown in the configuration of FIG. 4, the cable insert part 210 does not have the shield 300 on the upper surface of the cable body 200 and the conductor 100, so the conductor 100 may be exposed in the upward direction (+z-axis direction). In contrast, the cable shield part 220 has the shield 300 on the upper surface of the cable body 200 and the conductor 100. Accordingly, the conductor 100 is covered with the shield 300 and may not be exposed in the upward direction. However, for convenience of description, part of the conductor 100 is indicated by a dotted line in the drawings.

The cable insert part 210 is configured for insertion into the connector of the circuit board, and may be provided at the front side of the cable body 200. For example, the cable insert part 210 may be disposed at the front side (+y-axis direction in FIG. 4) of the cable body 200.

Particularly, in the flat cable according to the present disclosure, the cable insert part 210 of the cable body 200 may include a protruding portion 213. The protruding portion 213 may protrude out from one end of the conductor 100.

Moreover, the protruding portion 213 may protrude out from one end of the conductor 100 in the lengthwise direction of the flat cable. For example, as shown in the configuration of FIG. 4, the protruding portion 213 may protrude out from the front side end (+y-axis direction end) of the conductor 100 to a predetermined length in the forward direction (+y-axis direction) of the flat cable.

According to this configuration of the present disclosure, even though the cable insert part 210 is incorrectly inserted into the connector, the contact between the conductor 100 and the lead of the connector may be prevented by the protruding portion 213.

Preferably, the protruding portion 213 according to an embodiment of the present disclosure may protrude out from one end of the conductor 100 as much as a predetermined gap G, so that the gap G is formed between an extension line from one end of the conductor 100 and an extension line from one end of the protruding portion 213. For example, as shown in the configuration of FIG. 4, the protruding portion 213 may protrude forward from one end of the conductor 100 as much as a predetermined gap G in the forward direction (+y-axis direction) such that the gap G is formed between the extension line from one end of the conductor 100 and the extension line from one end of the protruding portion 213. Here, one end of the conductor 100 may refer to one end of the conductor 100 facing the lengthwise direction (+y-axis direction), and one end of the protruding portion 213 may refer to one end of the protruding portion 213 facing the lengthwise direction (+y-axis direction). That is, one end facing the forward direction (+y-axis direction) of the protruding portion 213 may protrude more by the predetermined gap G than one end facing the forward direction (+y-axis direction) of the conductor 100. According to this configuration of the present disclosure, even though the lead of the connector is close to the front side of the conductor 100, it is possible to prevent the contact between the lead and the front side end of the conductor 100.

Additionally, preferably, the cable insert part 210 according to the present disclosure may include a plurality of protruding portions 213. For example, the cable insert part 210 according to an embodiment of the present disclosure may include two protruding portions 213 as shown in the configuration of FIG. 4. Particularly, two or more protruding portions 213 may be spaced apart a predetermined distance in the widthwise direction (x-axis direction).

According to this configuration of the present disclosure, the spaced state may be stably maintained by two or more protruding portions 213. Particularly, even though the flat cable is on a slant, the conductor 100 may not contact the lead. In this instance, bearing power between the circuit board and the flat cable may be improved. Additionally, it is possible to improve convenience in the manufacturing process of the flat cable.

More preferably, the protruding portions 213 according to the present disclosure may be disposed at two ends of the cable insert part 210. Particularly, the protruding portions 213 may be disposed at two ends in the widthwise direction at the front end of the cable insert part 210. For example, as shown in the configuration of FIG. 4, the protruding portions 213 may be disposed at two ends in the widthwise direction (x-axis direction in FIG. 4) at the front side end (the end of +y-axis direction) facing the lengthwise direction (+y-axis direction) of the cable insert part 210.

Through this configuration, the protruding portions 213 according to the present disclosure may stably form a predetermined gap G to prevent the front side cross section of the conductor 100 from coming into contact with the lead of the connector. In detail, the protruding portions 213 according to the present disclosure may be disposed at two ends in the widthwise direction (x-axis direction) at the front end of the cable insert part 210 to form a stable contact between the circuit board and the cable insert part 210. Here, the front side cross section refers to a cross section formed at the front side (front side of +y-axis direction) of the lengthwise direction of the flat cable.

Preferably, the protruding portion 213 according to the present disclosure may be configured to have a cuboid shape as shown in the configuration of FIG. 4. In detail, the protruding portion 213 may be configured to have a cuboid shape with the front side cross section (the cross section of +y-axis direction) being flat. Additionally, the front side cross section (the cross section of +y-axis direction) of the protruding portion 213 may be parallel to the x axis.

Through this configuration, the protruding portion 213 according to the present disclosure may increase the area of the front side cross section of the protruding portion 213 so that the protruding portion 213 stably contacts the circuit board even though the cable insert part 210 is improperly inserted into the connector, to stably form a predetermined gap G, thereby preventing the front side cross section of the conductor 100 from coming into contact with the lead of the connector.

Preferably, the cable insert part 210 according to the present disclosure may include at least one fixing portion 215 as shown in the configuration of FIG. 4. The fixing portion 215 may be formed concavely in the inward direction from two sides of the cable insert part 210. Here, the side refers to an edge in the widthwise direction (x-axis direction) of the cable insert part 210. Additionally, the inward direction refers to a direction toward the inside of the cable insert part 210 from two sides of the cable insert part 210.

For example, the fixing portion 215 may be formed with a shape and size corresponding to the connector into which the cable insert part 210 is inserted. For example, as shown in the configuration of FIG. 4, the fixing portion 215 may be formed concavely in the inward direction of the cable insert part 210 in a rectangular shape. Through this configuration, when the cable insert part 210 is inserted into the connector, the fixing portion 215 may be fixed to the connector, and accordingly the cable insert part 210 may be stably fixed to the connector.

Figure 5:
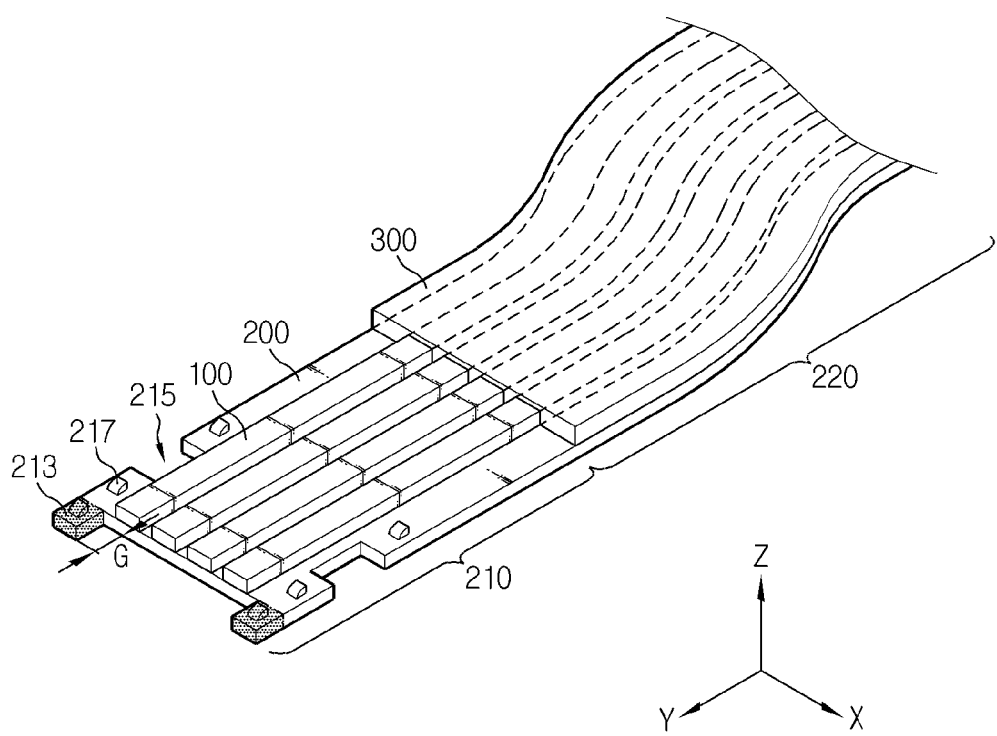
FIG. 5 is a schematic perspective view showing the configuration of a flat cable according to another embodiment of the present disclosure.

FIG. 5 is a schematic perspective view showing the configuration of a flat cable according to another embodiment of the present disclosure. However, for convenience of description, regarding a certain description of this embodiment to which the description of the previous embodiment may be similarly applied, its detailed description is omitted herein, and difference(s) will be primarily described.

Referring to FIG. 5, the cable insert part 210 according to the present disclosure may further include protrusion 217. The protrusion 217 may be provided on the upper surface of the cable insert part 210. For example, the protrusion 217 may be provided on the upper surface in +z-axis direction of the cable insert part 210. Here, the protrusion 217 may protrude out from the upper surface of the cable insert part 210 in +z-axis direction.

Preferably, a plurality of protrusions 217 may be provided. For example, as shown in the configuration of FIG. 5, the protrusion 217 may be provided in each protruding portion 213. Additionally, the protrusion 217 may be provided on two sides of the cable insert part 210.

Additionally, the protrusion 217 may have a round surface of the forward direction (+y-axis direction) and a flat surface of the rearward direction (−y-axis direction) as shown in the configuration of FIG. 5. Through this configuration, the protrusion 217 may allow easy coupling of the flat cable to the connector. Additionally, after the flat cable is coupled to the connector, the flat cable may be easily fixed to the connector through the protrusion 217.

Figure 6:
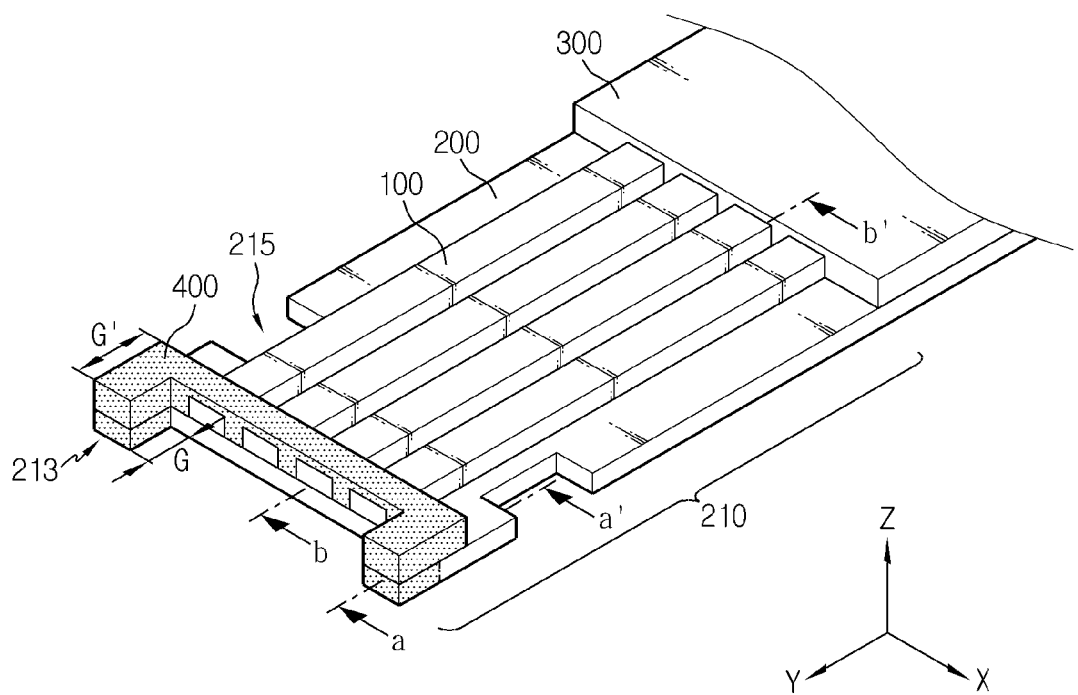
FIG. 6 is a schematic top view showing the configuration of a flat cable according to still another embodiment of the present disclosure.
Figure 7:
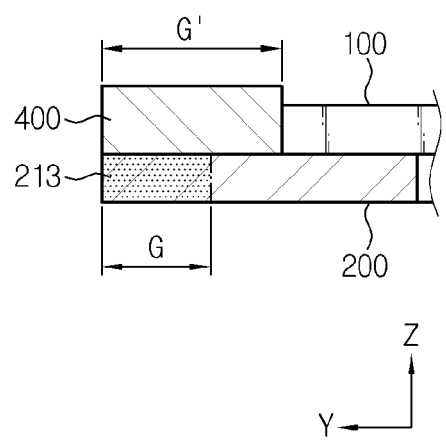
FIG. 7 is a cross-sectional view taken along the line a-a' of FIG. 6.
Figure 8:
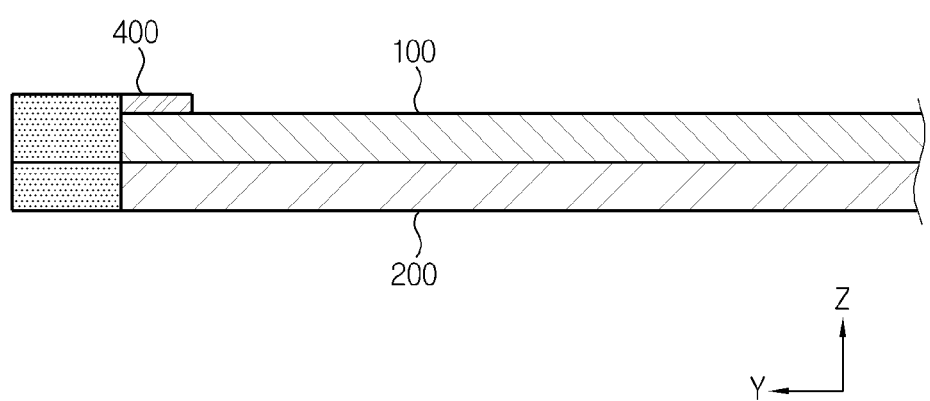
FIG. 8 is a cross-sectional view taken along the line b-b' of FIG. 6.

FIG. 6 is a schematic top view showing the configuration of a flat cable according to still another embodiment of the present disclosure. Additionally, FIG. 7 is a cross-sectional view taken along the line a-a' of FIG. 6, and FIG. 8 is a cross-sectional view taken along the line b-b' of FIG. 6. However, for convenience of description, regarding a certain description of this embodiment to which the description of the previous embodiment may be similarly applied, its detailed description is omitted herein, and difference(s) will be primarily described.

Referring to FIGS. 6 to 8, the cable insert part 210 according to the present disclosure may further include a reinforcing portion 400. The reinforcing portion 400 may be provided on at least part of the surface of the protruding portion 213 to reinforce the stiffness of the protruding portion 213, thereby preventing the protruding portion 213 from bending. For example, the reinforcing portion 400 may be provided on the upper surface (the upper surface of +z-axis direction) of the protruding portion 213 as shown in the configuration of FIGS. 6 and 7. According to this configuration of the present disclosure, even though the protruding portion 213 is bent by the strong pressure, the reinforcing portion 400 may prevent the contact between the lead of the connector and the conductor 100.

Particularly, the reinforcing portion 400 may be provided on not only the protruding portion 213 but also at least part of the surface of the conductor 100 and the cable body. For example, as shown in the configuration of FIG. 6, the reinforcing portion 400 may be provided on the upper surface continuously from the left side to the right side at the front side end of the cable insert part 210, i.e., the +y-axis direction end of the cable insert part on the basis of FIG. 6. In more detail, the reinforcing portion 400 may be provided on part of the surface of the cable insert part 210 as much as a predetermined length G in the lengthwise direction (y-axis direction in FIG. 6) of the cable insert part 210 from one end of the protruding portion 213. Additionally, the reinforcing portion 400 may be continuously provided from one side of the cable insert part 210 to the other side in the widthwise direction (x-axis direction). Here, the protruding portion 213 refers to part of the cable body 200 corresponding to the predetermined gap G from one end of the cable body 200.

Particularly, the reinforcing portion 400 may be provided on at least part of the surface of the conductor 100. For example, the reinforcing portion 400 may be provided on at least one surface of the conductor 100 as shown in the configuration of FIGS. 6 and 8. In this case, the reinforcing portion 400 may extend straight in the widthwise direction (x-axis direction) of the cable body 200 such that the reinforcing portion 400 is provided on part of the surface of the plurality of conductors 100 and the cable body 200.

Through this configuration, the reinforcing portion 400 according to the present disclosure may increase the stiffness of the protruding portion 213 to prevent the protruding portion 213 from bending.

Preferably, the reinforcing portion 400 according to the present disclosure may be made of a material having higher stiffness than that of the protruding portion 213. According to this configuration, although the cable insert part 210 is made of a flexible material and has flexibility and bend resistance, the stiffness of the protruding portion 213 may be improved.

The reinforcing portion 400 may be provided in the cable insert part 210 in various shapes.

For example, the reinforcing portion 400 may be formed in the shape of a tape having an adhesive applied on at least one surface, and be attached to at least part of the surface of the protruding portion 213. In this case, the reinforcing portion 400 may be made of an insulating material, and in this instance, the tape type reinforcing portion 400 may be attached to at least part of the surface of the protruding portion 213.

According to this configuration of the present disclosure, the reinforcing portion 400 covers the front end of the cable insert part 210 entirely in the widthwise direction, and when the cable insert part 210 includes the reinforcing portion 400 of this shape, convenience in manufacturing the flat cable is offered.

Additionally, the reinforcing portion 400 may be provided such that the reinforcing portion 400 is inserted into at least part of the protruding portion 213 in the shape of a cap. It will be described in more detail with referenced to FIGS. 9 and 10.

Figure 9:
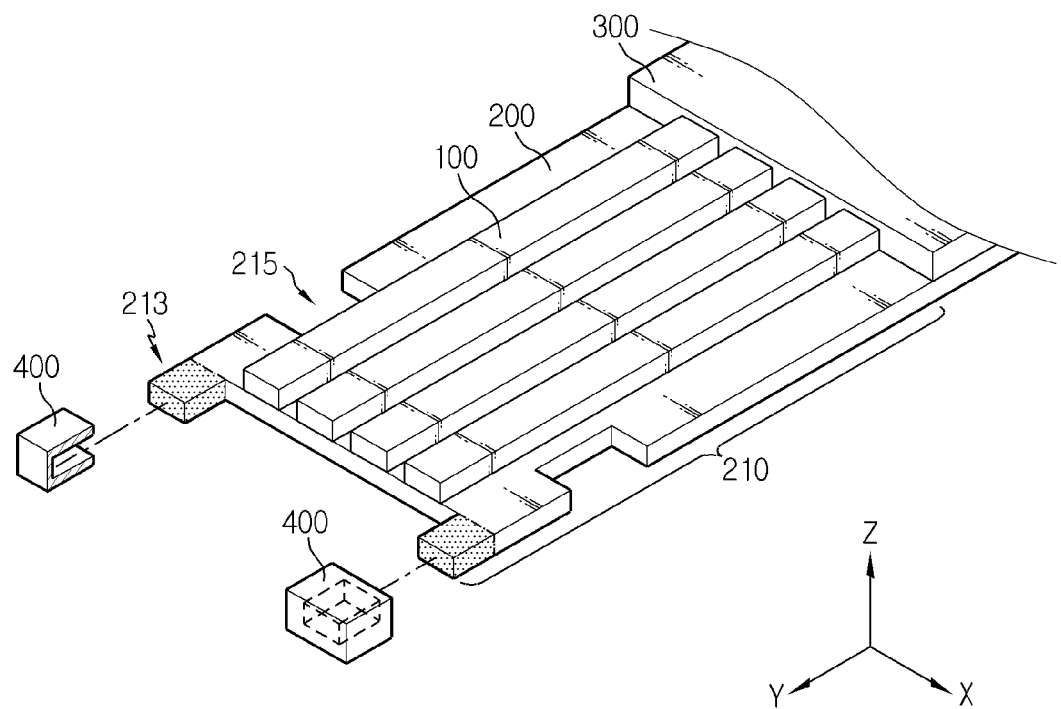
FIGS. 9 and 10 are schematic perspective views showing a flat cable having a reinforcing portion according to yet another embodiment of the present disclosure.
Figure 10:
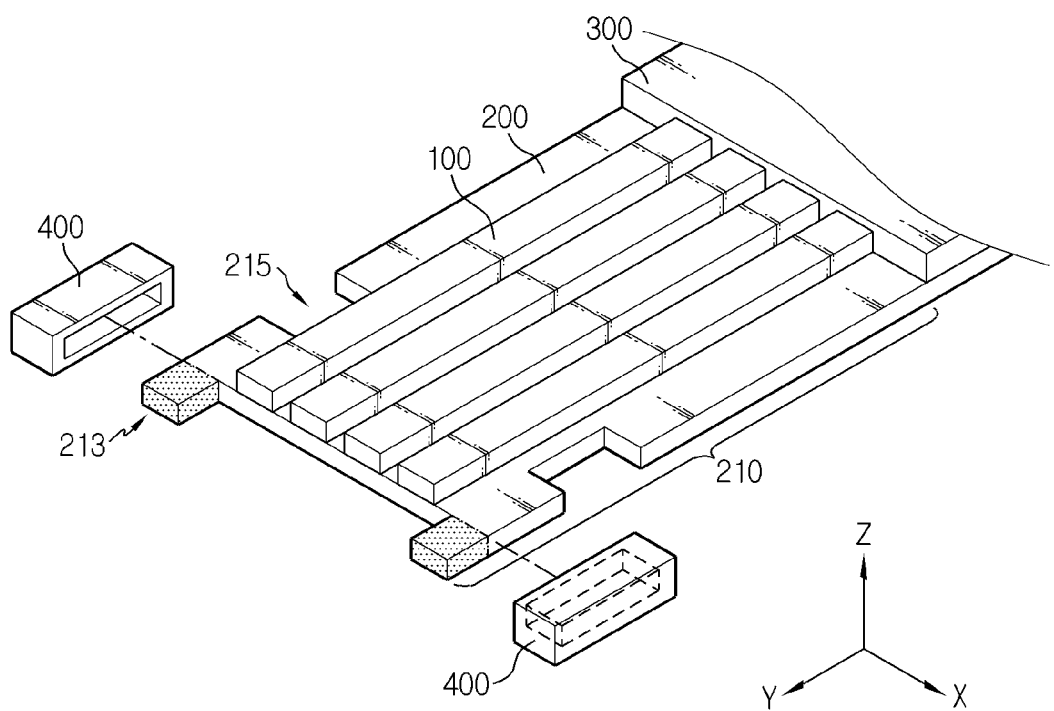

FIGS. 9 and 10 are schematic perspective views showing a flat cable having a reinforcing portion according to yet another embodiment of the present disclosure.

Referring to FIGS. 9 and 10, the reinforcing portion 400 according to an embodiment of the present disclosure may be provided such that the reinforcing portion 400 is inserted into at least part of the protruding portion 213. In this case, the reinforcing portion 400 may be made of an insulating material. Additionally, the reinforcing portion 400 may be formed in the shape of a cap. The cap type reinforcing portion 400 may be inserted into part of the protruding portion 213 and mounted on at least part of the surface of the protruding portion 213.

Particularly, the reinforcing portion 400 may cover at least part of the surface of the protruding portion 213. For example, the reinforcing portion 400 may have an internal space (hollow) in a shape for receiving the protruding portion 213. Additionally, the reinforcing portion 400 may have at least one open side of the hollow so that the protruding portion 213 may be inserted into the internal space. In this case, the reinforcing portion 400 may move as indicated by the dotted line in FIGS. 9 and 10 and cover at least part of the protruding portion 213 through the open part of the hollow. That is to say, the protruding portion 213 may be inserted into the hollow through the open part of the reinforcing portion 400.

In more detail, first, referring to FIG. 9, the reinforcing portion 400 according to an embodiment of the present disclosure may be formed in a shape that covers the exposed front surface of the protruding portion 213 and be inserted into the protruding portion 213. For example, as shown in the configuration of FIG. 9, when the protruding portion 213 is formed in a cuboid shape, the reinforcing portion 400 may be formed in the shape of a cap having a cuboid internal space and be inserted into the protruding portion 213. Here, the internal space (hollow) of the protruding portion 213 may have an open rear end side (−y-axis direction). In this case, the reinforcing portion 400 may move from the front side of the cable insert part 210 toward the cable insert part 210 as shown in FIG. 9 and cover the protruding portion 213. Meanwhile, in this configuration, a plurality of reinforcing portion 400 corresponding to the number of protruding portions 213 may be provided.

Next, referring to FIG. 10, the reinforcing portion 400 according to an embodiment of the present disclosure may be configured to move in the widthwise direction of the cable insert part 210 from the side of the cable insert part 210 and cover the protruding portion 213. In this case, the reinforcing portion 400 may be configured to cover not only the protruding portion 213 but also portions other than the protruding portion 213.

Particularly, this configuration may be applied to the cable insert part 210 having the fixing portion 215 more easily. For example, as shown in the configuration of FIG. 10, when a plurality of fixing portions 215 formed concavely in the inward direction from two sides of the cable insert part 210 is provided, a cuboid shape including the protruding portion 213 may be formed at the front end of the cable insert part 210. That is, the cuboid shape may be formed from one end of the protruding portion 213 to one end of the fixing portion 215. In this case, the reinforcing portion 400 may be configured to cover part of the surface of the cuboid shape. In this case, the reinforcing portion 400 may be inserted such that the reinforcing portion 400 covers at least part of the surface of the protruding portion 213. Here, the reinforcing portion 400 may be attachable and detachable.

Through this configuration, the reinforcing portion 400 according to the present disclosure may increase the stiffness of the protruding portion 213 to prevent the protruding portion 213 from bending.

Besides, the reinforcing portion 400 may be provided such that the reinforcing portion 400 coats at least part of the surface of the protruding portion 213. In this case, the reinforcing portion 400 in the form of a coating made of an insulating material may be coated on at least part of the surface of the protruding portion 213.

Additionally, the reinforcing portion 400 may be provided such that the reinforcing portion 400 changes the phase of at least part of the surface of the protruding portion 213. In this case, the reinforcing portion 400 may be provided on the surface of the protruding portion 213 to change the phase of the protruding portion 213 in order to increase the stiffness of the protruding portion 213. For example, the reinforcing portion 400 may be implemented from an insulating material or a phase change material that was known at the time of filing the application.

Figure 11:
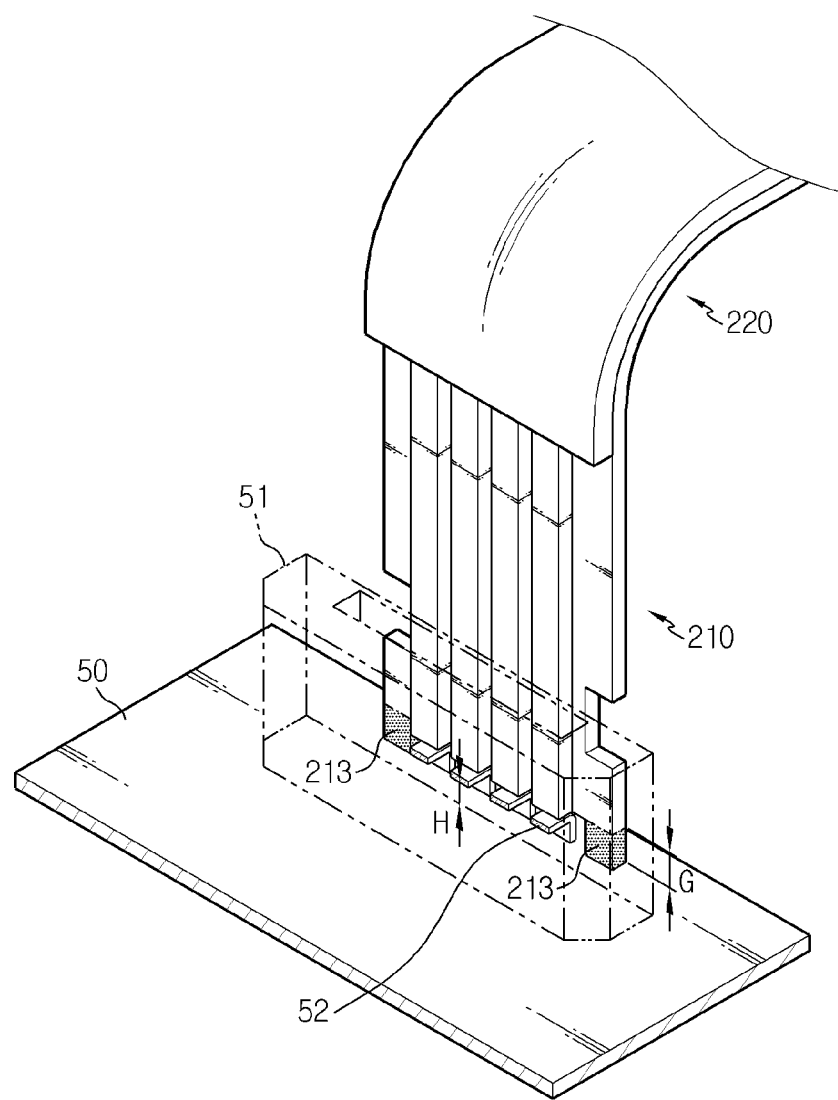
FIG. 11 is a schematic diagram showing a contact between the front end of a flat cable according to an embodiment of the present disclosure and a circuit board when the flat cable is incorrectly inserted into a connector.

FIG. 11 is a schematic diagram showing a contact between the front end of the flat cable according to an embodiment of the present disclosure and the circuit board when the flat cable is incorrectly inserted into the connector. However, for convenience of description, regarding a certain description of this embodiment to which the description of the previous embodiment may be similarly applied, its detailed description is omitted herein, and difference(s) will be primarily described.

Referring to FIG. 11, when the flat cable according to the present disclosure is incorrectly inserted into the connector, the front end of the flat cable may come into contact with the circuit board. In this case, as the flat cable according to the present disclosure includes the protruding portion 213 protruding forward at the front end, the protruding portion 213 may contact the circuit board 50. Additionally, when the protruding portion 213 contacts the circuit board 50, the end of the conductor indented more inward in a concave shape than the protruding portion may not contact the lead 52.

Preferably, the protruding portion 213 may have a protrusion height that is higher than the height H of the lead connected to the circuit board 50. Here, the height H of the lead refers to a distance from the surface of the circuit board to the highest part of the lead 52.

For example, the protruding portion 213 may protrude as much as the predetermined gap G, i.e., the protrusion height in the lengthwise direction (y-axis direction in FIG. 10) of the cable insert part 210 from one end of the conductor 100. In this case, the protruding portion 213 may protrude higher than the height of the lead 52, namely, the height H from the surface of the circuit board 50 to the lead 52 to prevent the contact between the lead 52 and the conductor 100.

More preferably, even though there is no contact between the lead 52 and the conductor 100, the protruding portion 213 may prevent the electrical contact from being formed between the lead 52 and the conductor 100 through air such as spark generation. That is, the protruding portion 213 may protrude such that a predetermined gap is formed between the lead 52 and the conductor 100 to ensure insulation. For example, the distance between the lead 52 and the conductor 100 may be 0.13 mm or more. In this case, the protrusion distance G of the protruding portion 213 may be implemented as the sum of the height H of the lead and the distance (for example, the distance of 0.13 mm or more) for ensuring insulation between the lead 52 and the conductor 100.

The flat cable according to the present disclosure may be provided in a battery pack by itself. That is, the battery pack according to the present disclosure may include the above-described flat cable according to the present disclosure. Here, the battery pack may include a cell assembly including at least one secondary battery, the flat cable, an electrical component (a BMS, a relay, a fuse, etc.) and a case. In this configuration, the flat cable according to the present disclosure may electrically connect the cell assembly to the Battery Management System (BMS). Additionally, the flat cable may transmit the voltage value, the current value or the temperature value of the secondary battery to the BMS. Here, the secondary battery refers to a physically separable independent cell including a negative terminal and a positive terminal. For example, a pouch-type lithium polymer cell may be regarded as a secondary battery.

Although the terms indicating directions such as up, down, left, right, forward and rearward are used herein, these terms are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. A flat cable extending straight in a lengthwise direction until a front edge, the flat cable comprising:
a plurality of conductors made of an electrical conductive material, and extending straight along the lengthwise direction of the flat cable to the front edge of the flat cable, wherein the plurality of conductors are spaced apart a predetermined distance in a widthwise direction of the flat cable;
a cable body made of an insulating material, and extending straight along the lengthwise direction of the flat cable, wherein the conductors are mounted on an upper surface of the cable body, wherein a cable insert portion of the cable body is configured to be inserted and connected to an external connector, wherein the cable insert portion of the cable body extends in the lengthwise direction until the front edge of the flat cable, and wherein the cable insert portion includes a protruding portion protruding out in the lengthwise direction of the flat cable beyond the plurality of conductors; and a reinforcing portion positioned on the upper surface of the cable body, including at least part of the protruding portion, and configured to reinforce stiffness of the protruding portion, wherein the reinforcing portion extends in the lengthwise direction of the flat cable beyond the plurality of conductors, wherein the reinforcing portion is positioned over a surface of the plurality of conductors such that the plurality of conductors are positioned between the cable body and the reinforcing portion.

2. The flat cable according to claim 1, wherein the protruding portion is configured to protrude out a predetermined distance in the lengthwise direction beyond the plurality of conductors such that a gap is formed between an extension line defined by an end of the plurality of conductors and an extension line defined by an end of the protruding portion.

3. The flat cable according to claim 1, wherein the protruding portion includes a plurality of protrusions, each protrusion extending in the lengthwise direction of the flat cable beyond the plurality of conductors.

4. The flat cable according to claim 3, wherein the plurality of protrusions comprises at least two protrusions disposed at opposite ends of the cable body in the widthwise direction.

5. The flat cable according to claim 1, wherein the protruding portion is configured to have a cuboid shape.

6. The flat cable according to claim 1, wherein the cable insert portion of the cable body further includes at least one fixing portion formed concavely inward from opposing sides of the cable insert portion in the widthwise direction and configured to stably fix the cable insert part to the external connector when the cable insert part is inserted into the external connector.

7. The flat cable according to claim 1, wherein the protruding portion is formed with a protrusion height that is higher than a height of a lead connected to a circuit board having the external connector.

8. A battery pack comprising the flat cable according to claim 1.

9. The flat cable according to claim 1, wherein the reinforcing portion extends from end to end of the cable insert part in the widthwise direction of the flat cable.

10. The flat cable according to claim 1, wherein a front edge of the plurality of conductors is indented inward from a front edge of the protruding portion, such that the front edge of the flat cable is a concave shape.

* * * * *